US010821386B2

United States Patent
Hofmann et al.

(10) Patent No.: US 10,821,386 B2
(45) Date of Patent: *Nov. 3, 2020

(54) APPARATUS FOR ADDITIVE MANUFACTURING OF THREE-DIMENSIONAL OBJECTS

(71) Applicant: CL SCHUTZRECHTSVERWALTUNGS GMBH, Lichtenfels (DE)

(72) Inventors: Alexander Hofmann, Weismain (DE); Jens Stammberger, Rödental (DE); Ralf Hetzel, Bad Staffelstein (DE)

(73) Assignee: CONCEPT LASER GMBH, Lichtenfels (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/812,466

(22) Filed: Nov. 14, 2017

(65) Prior Publication Data
US 2018/0133635 A1  May 17, 2018

(30) Foreign Application Priority Data
Nov. 14, 2016 (DE) .................. 10 2016 121 784

(51) Int. Cl.
*B01D 46/00* (2006.01)
*B29C 64/153* (2017.01)
(Continued)

(52) U.S. Cl.
CPC ....... *B01D 46/001* (2013.01); *B01D 46/0013* (2013.01); *B01D 46/0017* (2013.01);
(Continued)

(58) Field of Classification Search
CPC ...... B22F 2003/1055; B22F 2003/1059; B22F 2003/1056; B29C 64/35; B29C 64/153
See application file for complete search history.

(56) References Cited

U.S. PATENT DOCUMENTS 4,336,043 A * 6/1982 Aonuma ............ B01D 46/0012
 210/259
8,794,263 B2 8/2014 Scott et al.
(Continued)

FOREIGN PATENT DOCUMENTS

CN   105920927 A   9/2016
DE   202012013036 U1   8/2014
(Continued)

OTHER PUBLICATIONS

German Office Action No. 1020161217832.
European Search Report 17177216 dated Feb. 20, 2018.

*Primary Examiner* — Jacob T Minskey
*Assistant Examiner* — Cedrick S Williams
(74) *Attorney, Agent, or Firm* — Dority & Manning, P.A.

(57) ABSTRACT

An apparatus for additive manufacturing of three-dimensional objects by successive, selective layer-by-layer exposure and thus successive, selective layer-by-layer solidification of construction material layers of construction material that can be solidified by means of an energy beam, comprising a filter device provided for filtering process gas arising in the course of performing additive construction processes in a process chamber of the apparatus, wherein the filter device comprises several filter modules with a filter module housing each, wherein every filter module housing comprises a filter body receiving room configured with a defined geometry provided for receiving a defined number of filter bodies configured with a defined geometry, wherein every filter module comprises connection interfaces on the filter module via which it is or can be connected, if required, to defined connection areas of a pipe structure of the apparatus that is or can be flown through by the process gas.

20 Claims, 2 Drawing Sheets

(51) Int. Cl.
   *B33Y 30/00* (2015.01)
   *B29C 64/371* (2017.01)
   *B22F 3/105* (2006.01)
   *B29C 64/35* (2017.01)
   *B33Y 40/00* (2020.01)
   *B01D 46/42* (2006.01)
   *B01D 46/24* (2006.01)
   *B29C 64/268* (2017.01)
   *B33Y 10/00* (2015.01)
   *B33Y 50/02* (2015.01)
(52) U.S. Cl.
   CPC ..... *B01D 46/0089* (2013.01); *B01D 46/0091* (2013.01); *B01D 46/2403* (2013.01); *B01D 46/4272* (2013.01); *B22F 3/1055* (2013.01); *B29C 64/153* (2017.08); *B29C 64/35* (2017.08); *B29C 64/371* (2017.08); *B33Y 30/00* (2014.12); *B33Y 40/00* (2014.12); *B22F 2003/1059* (2013.01); *B29C 64/268* (2017.08); *B33Y 10/00* (2014.12); *B33Y 50/02* (2014.12); *Y02P 10/295* (2015.11)

(56) References Cited

U.S. PATENT DOCUMENTS

| | | | |
|---|---|---|---|
| 10,265,772 B2 | 4/2019 | Mironets et al. | |
| 2013/0025246 A1* | 1/2013 | Burns | B01D 46/2403 |
| | | | 55/498 |
| 2014/0287080 A1 | 9/2014 | Scott et al. | |
| 2016/0207147 A1 | 7/2016 | Van Hassel | |
| 2019/0001413 A1* | 1/2019 | Golz | B22F 3/1055 |
| 2019/0022946 A1* | 1/2019 | Jones | B22F 3/008 |

FOREIGN PATENT DOCUMENTS

| | | | | |
|---|---|---|---|---|
| DE | 102014207160 A1 | 10/2015 | | |
| DE | 102014010942 A1 | 1/2016 | | |
| JP | H07100311 A | 4/1995 | | |
| JP | 2012501828 A | 1/2012 | | |
| WO | 2010026396 A2 | 3/2010 | | |
| WO | WO2014164807 A1 | 10/2014 | | |
| WO | 2016079494 A2 | 5/2016 | | |
| WO | WO-2016079494 A2 * | 5/2016 | ............. | B33Y 10/00 |
| WO | 2016102970 A1 | 6/2016 | | |

* cited by examiner

APPARATUS FOR ADDITIVE MANUFACTURING OF THREE-DIMENSIONAL OBJECTS

CROSS-REFERENCE TO RELATED APPLICATIONS

This application claims priority to German Patent Application serial no. 10 2016 121 784.0 filed Nov. 14, 2016, the contents of which is incorporated herein by reference in its entirety as if set forth verbatim.

The invention relates to an apparatus for additive manufacturing of three-dimensional objects by successive, selective layer-by-layer exposure and thus successive, selective layer-by-layer solidification of construction material layers of construction material that can be solidified by means of an energy beam, comprising a filter device provided for filtering process gas arising in the course of performing additive construction processes in a process chamber of the apparatus, especially containing impurities arising in relation to the process.

Respective apparatuses for additive manufacturing of three-dimensional objects are basically known, for example, in the form of apparatuses for performing selective laser sintering or selective laser melting methods. Respective apparatuses typically comprise a filter device provided for filtering process gas arising in the course of performing additive construction processes in a process chamber of the apparatus, especially containing impurities arising in relation to the process, i.e., especially what is known as smoke residue particles.

The specific requirements for respective filter devices, i.e., for example, a maximum filter volume filterable with the filter device, may vary for different additive construction processes, e.g., depending on the geometric structural design of the respective object(s) to be manufactured additively. For example, it can be determined with empirical values or simulations which amount of impurities is to be expected in a process gas. It might be advantageous, e.g., for efficient operation of the filter device, to use a filter device with a comparably large or comparably small maximum filterable filter volume for a specific additive construction process, for example.

As of now, no entirely satisfactory solution is known for a filter device that can be adapted with regard to the specific requirements given in different additive construction processes.

The invention is based on the object to provide, in contrast to the above, an improved apparatus for additive manufacturing of three-dimensional objects.

The object is solved by an apparatus for additive manufacturing of three-dimensional objects according to claim 1. The dependent claims relate to possible embodiments of the apparatus.

The apparatus described herein ("apparatus") is provided for additive manufacturing of three-dimensional objects, i.e., for example, technical components or technical component groups, by successive, selective layer-by-layer exposure and thus successive, selective layer-by-layer solidification of construction material layers of construction material that can be solidified. The construction material can be a particulate or powdered metal material, plastic material, and/or ceramic material. The selective solidification of respective construction material layers to be solidified selectively is performed based on object-related construction data. Respective construction data describe the geometric structural design of the respective object to be manufactured additively and can contain, for example, "sliced" CAD data of the object to be manufactured additively. The apparatus can be formed as an SLM apparatus, i.e., as an apparatus for performing selective laser melting methods (SLM methods), or as an SLS apparatus, i.e., as an apparatus for performing selective laser sintering methods (SLS methods).

The apparatus comprises the functional components typically required to perform additive construction processes, including especially a coating device provided for forming construction material layers to be solidified selectively (in the construction plane of the apparatus) and an exposure device provided for selectively exposing construction material layers to be solidified selectively (in the construction plane of the apparatus). The coating device typically comprises several components, i.e., for example, a coating element comprising an, especially blade-shaped, coating tool and a guiding device for guiding the coating element along a defined movement path. The exposure device typically comprises several components as well, i.e., for example, a beam generation device for generating an energy or laser beam, a beam deflection device (scanner device) for deflecting an energy or laser beam generated by the beam generation device onto an area to be exposed of a construction material layer to be solidified selectively, and diverse optical elements such as lens elements, objective elements, etc.

The apparatus comprises a filter device provided for filtering process gas arising in the course of performing additive construction processes in a process chamber of the apparatus, especially containing impurities arising in relation to the process. Filtering the process gas is understood to mean removing the corresponding impurities from the process gas. The corresponding impurities in process gas to be filtered are especially smoke or smoulder particles arising in relation to the process and/or non-solidified construction material particles ("weld spatters").

The filter device comprises several filter modules. Every filter module comprises a filter module housing. Every filter module housing comprises a filter body receiving room configured with a defined geometry. The filter body receiving room is provided for receiving (only) a defined number of filter bodies configured with a defined geometry. In other words, a respective filter body receiving room is configured with such a defined geometry, i.e., has such a geometric structural design that, with regard to the filter bodies that are or can be received therein, only the number of filter bodies configured with a defined geometry defined for the respective filter module can be received in it. Regardless of its geometrical configuration, a filter body is formed of or at last comprises, e.g., porous or cellular filter material.

For example, a filter module housing or filter body receiving room can have a (hollow) cylindrical base shape with given dimensions, i.e., a given outside and inside radius and a given height; a respective filter body receiving room is configured with a defined geometry as a cylinder or hollow cylinder with given dimensions, in which, due to its geometrically defined configuration, only a defined number of filter bodies configured with a defined geometry, i.e., filter bodies with a ring-shaped or ring segment-shaped base shape, the outside and inside radius and height or total height of which are adapted to the dimensions of the filter body receiving room, can be received. Of course, the explanations apply analogously to filter module housings or filter body receiving rooms with a base shape different from a (hollow) cylinder.

Therefore, a respective filter body receiving room has a spatially defined filter body receiving room volume in which (only) the respective defined number of filter bodies configured with a defined geometry is or can be received. A defined number of filter bodies configured with a defined geometry is also understood to mean a number of one, i.e., a filter body receiving room can also receive just one (single) filter body configured with a defined geometry.

The filter module housings of the filter modules typically differ in the respective defined number of filter bodies configured with a defined geometry that are or can be received in the respective filter body receiving rooms configured with a defined geometry comprised in the filter module housing. Therefore, the filter body receiving rooms of the respective filter module housings typically differ in their respective filter body receiving volumes, wherein every filter body receiving room can receive only a defined number of filter bodies configured with a defined geometry.

Starting out from filter bodies with a specific geometrically defined configuration, a first filter module can comprise a filter body receiving room in which a first number of such filter bodies is or can be received, and a second (or further) filter module can comprise a filter body receiving room in which a second number, which is different from the first number, of such filter bodies is or can be received. For example, a first filter module can comprise a filter body receiving room in which just one single such filter body is or can be received; a second filter module can comprise a filter body receiving room in which, with regard to the filter body receiving room of the first filter module, at least one more such filter body is or can be received; a third filter module can comprise a filter body receiving room in which, with regard to the filter body receiving room of the second filter module, at least one more such filter body is or can be received, and so forth.

If several filter bodies are received in a filter body receiving room, these can be arranged, e.g., stack-type on top of each other. The filter bodies can be arranged aligned with each other. If the filter bodies have a ring-type or ring-shaped form, generally with an interior defined by the filter body, the respective interiors defined by the filter body can therefore be aligned with each other. As an alternative to a stack-type arrangement of respective filter bodies on top of each other, a row-type arrangement of respective filter bodies next to each other is also imaginable.

Every filter module comprises (two) connection interfaces via which it is or can be connected, if required, to defined connection areas of a line or pipe structure of the apparatus that is or can be flown through by the (filtered or to be filtered) process gas. The connection areas of the apparatus can comprise, e.g., connecting pieces comprising flange areas. The filter modules associated with the filter device can therefore be exchanged if required to ensure efficient operation of the filter device for a specific additive construction process. As explained in connection with the state of the art described at the beginning, it might sometimes be advantageous for efficient operation of the filter device to use a filter device with a comparably large or comparably small maximum filterable filter volume. Overall, a filter device with a variably adaptable filter size is thus provided. The filter size is conditional upon the use of different filter modules or the different number of filter bodies received in the filter body receiving rooms of the filter module housings of the respective filter modules.

Respective connection interfaces on the filter module can comprise suitable fastening and sealing elements. The connection interfaces can be formed as connecting pieces comprising flange areas. Respective connecting pieces or flange areas typically comprise fastening and sealing elements. Respective fastening elements can be provided for fastening a filter module in a firm stabilized position to the connection areas of the apparatus. A fastening element can allow form-locked and/or force-locked fastening of the filter module to a connection area of the apparatus. A fastening element allowing form-locked and/or force-locked fastening of a filter module to a connection area of the apparatus can be, e.g., a fastening or clamping clip. Respective fastening elements can therefore be or comprise, e.g., subring-type or full ring-type or -shaped fastening or clamping clips. Respective sealing elements can be or comprise, e.g., sealing rings.

The connection interfaces of all filter modules are advantageously configured identically; this facilitates any required exchange of respective filter modules. The option to easily exchange filter modules increases the overall operational efficiency of the apparatus.

Advantageously, a respective filter module forms a preconfigurable or preconfigured assembly group that can be handled separately. The handling of respective filter modules is hence facilitated, filter modules can be handled smoothly, especially also automatably or automatedly, e.g., in connection with an exchange as described.

Typically, only filter module housings with a specific geometrically defined configuration, especially a specific length, are connectible to the connection areas of the apparatus; therefore, typically only filter module housings with a specific geometrically defined configuration, especially a specific length, can be connected to the connection areas of the apparatus. The filter modules associated with the filter device therefore advantageously have a respective geometrically defined configuration, especially a respective length. The geometrically defined configuration of the filter modules allows especially precisely fitting connection of the filter modules to the connection areas of the apparatus.

To ensure (position-) stable arrangement of respective filter bodies in respective filter body receiving rooms comprised in the filter module housing, the filter body/bodies received in a respective filter body receiving room can be received with a force or press fit in the respective filter body receiving room. The force or press fit can be established with a certain oversize of the filter bodies received in a respective filter body receiving room compared to the filter body receiving room.

Every filter module can comprise a closure device arranged or formed on the filter module housing. A respective filter module housing can have an access opening that can be closed with the respective closure device and forms an access option into the respective filter body receiving room. The interaction of the closure device and the access opening allows a possibly required, i.e., for example, for service purposes, exchange of a (or several) filter body/bodies received in a respective filter body receiving room.

The closure device can comprise a cap-like closing element, possibly arranged or formed movably on the filter module housing. The closing element can be movably (pivotingly) supported between an open position in which the closing element is moved relatively to the access opening such that accessing the filter body receiving room is possible, and a closed position in which the closing element is moved relatively to the access opening such that accessing the filter body receiving room is not possible. In the closed position, the closing element is typically moved relatively to the access opening, i.e., especially towards the access opening, such that the filter body receiving room is closed fluid-tightly.

In every filter module housing, a flow channel structure can be formed that can be or, during operation of the filter device, is flown through by the process gas or a process gas flow. The flow channel structure can comprise a first flow channel structure section comprising an, especially tubular, inflow section for flowing process gas or a process gas flow to be filtered into the filter module and a second flow channel structure section comprising an, especially tubular, outflow section for flowing a filtered process gas or process gas flow out of the filter module. The two flow channel structure sections communicate with each other. The filter body/bodies received in the respective filter body receiving room comprised in the filter module housing are arranged between the first and second flow channel structure section.

In addition to the apparatus, the invention also relates to a filter device for an apparatus for additive manufacturing of three-dimensional objects by successive, selective layer-by-layer exposure and thus successive, selective layer-by-layer solidification of construction material layers of construction material that can be solidified by means of an energy beam. The filter device comprises several filter modules with a filter module housing each, wherein every filter module housing comprises a filter body receiving room configured with a defined geometry provided for receiving a defined number of filter bodies configured with a defined geometry, wherein every filter module comprises connection interfaces on the filter module via which it is or can be connected, if required, to defined connection areas of a pipe structure of the apparatus that is or can be flown through by the process gas. All explanations in connection with the filter device described in connection with the apparatus apply analogously to the filter device.

The invention is explained in more detail by means of exemplary embodiments in the drawings. In which:

FIG. 1 shows a schematic diagram of an apparatus 1 according to an exemplary embodiment. FIG. 1 only shows the section of the apparatus 1 relevant to explaining the principle described in the following in a sectional view.

Figure 1:
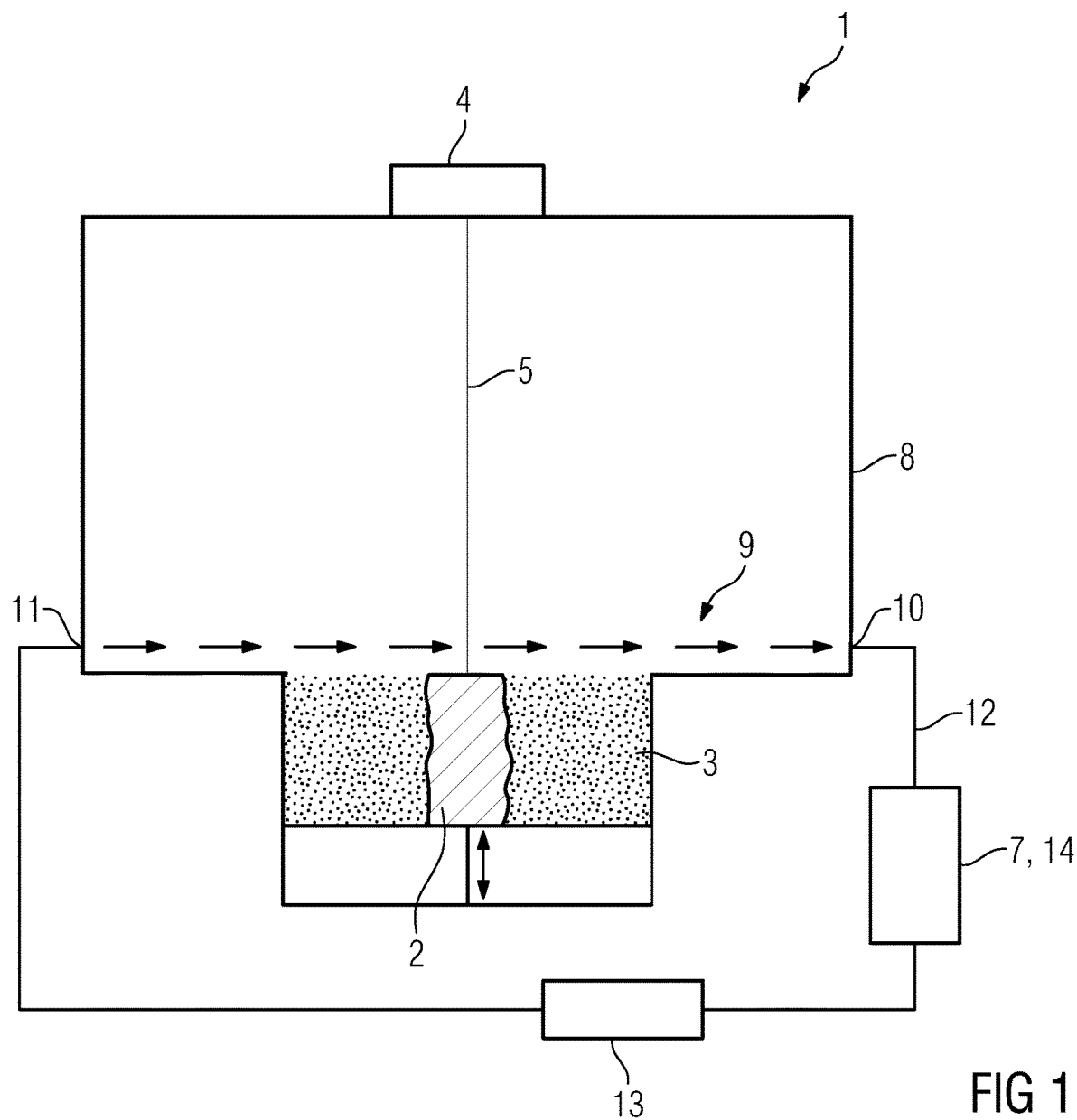
FIG. 1 shows a schematic diagram of an apparatus according to an exemplary embodiment.

The apparatus 1 serves for additive manufacturing of three-dimensional objects 2, i.e., especially technical components or technical component groups, by successive, selective layer-by-layer exposure and thus successive, selective layer-by-layer solidification of construction material layers of construction material 3 that can be solidified, i.e., for example, metal powder, by means of a laser beam 5. The selective solidification of respective construction material layers to be solidified is performed based on object-related construction data. Respective construction data describe the geometric or geometric structural design of the respective object 2 to be manufactured additively and can, for example, include "sliced" CAD data of the object 2 to be manufactured. The apparatus 1 can be formed as a LaserCUSING® apparatus, i.e., as an apparatus for performing selective laser melting methods.

The apparatus 1 comprises the functional components required to perform additive construction processes, including a coating device (not shown) provided for forming construction material layers to be solidified selectively (in the construction plane of the apparatus 1) and an exposure device 4 provided for selectively exposing construction material layers to be solidified selectively (in the construction plane of the apparatus 1). The coating device comprises several components, namely a coating element comprising an, especially blade-shaped, coating tool and a guiding device for guiding the coating element along a defined movement path. The exposure device 4 comprises several components as well (not shown in detail), namely a beam generation device for generating the laser beam 5, a beam deflection device for deflecting the laser beam 5 generated by the beam generation device onto an area to be exposed of a construction material layer to be solidified selectively, and diverse optical elements (not shown) such as objective elements, lens elements, etc., which are typically arranged between the beam generation device and the beam deflection device.

The mentioned functional components of the apparatus 1 are arranged or formed on or in a process chamber 8 of the apparatus 1. The process chamber 8 is rendered inert, i.e., filled with an inert gas such as argon, nitrogen, etc.

The apparatus 1 furthermore comprises a filter device 7. The filter device 7 is provided for filtering process gas 9 arising in the course of performing additive construction processes in the process chamber 8 of the apparatus 1, especially containing impurities arising in relation to the process. The corresponding impurities in process gas to be filtered are especially smoke or smoulder particles arising in relation to the process and/or non-solidified construction material particles ("weld spatters"). The flow of the process gas 9 through the process chamber 8, i.e., the process gas flow, is indicated by the arrows.

Evidently, the filter device 7 is connected to a line or pipe structure 12 extending between an outflow opening 10 of the process chamber and an inflow opening 11 of the process chamber and comprising several pipe elements (not denoted in more detail). Furthermore connected to the line or pipe structure 12 is a pump device 13 provided for generating a suction flow that allows flowing of the process gas 9 through the line or pipe structure 12, i.e., also through the filter device 7. Evidently, a closed flow circuit is formed by the process chamber 8 and the line or pipe structure 12; hence, the process gas 9 flows between the process chamber 8 and the line or pipe structure 12 in a closed flow circuit.

The filter device 7 comprises several filter modules 14. Every filter module 14 comprises a filter module housing 15 comprising a filter body receiving room 16 configured with a defined geometry. The filter body receiving room 16 of a filter module 14 is provided for receiving (only) a defined number of filter bodies 18 configured with a defined geometry. A respective filter body receiving room 16 is configured with such a defined geometry, i.e., has such a geometric structural design, that, with regard to the filter bodies 18 that are or can be received therein, only the number of filter bodies 18 configured with a defined geometry defined for the respective filter module 14 can be received in it.

Figure 2:
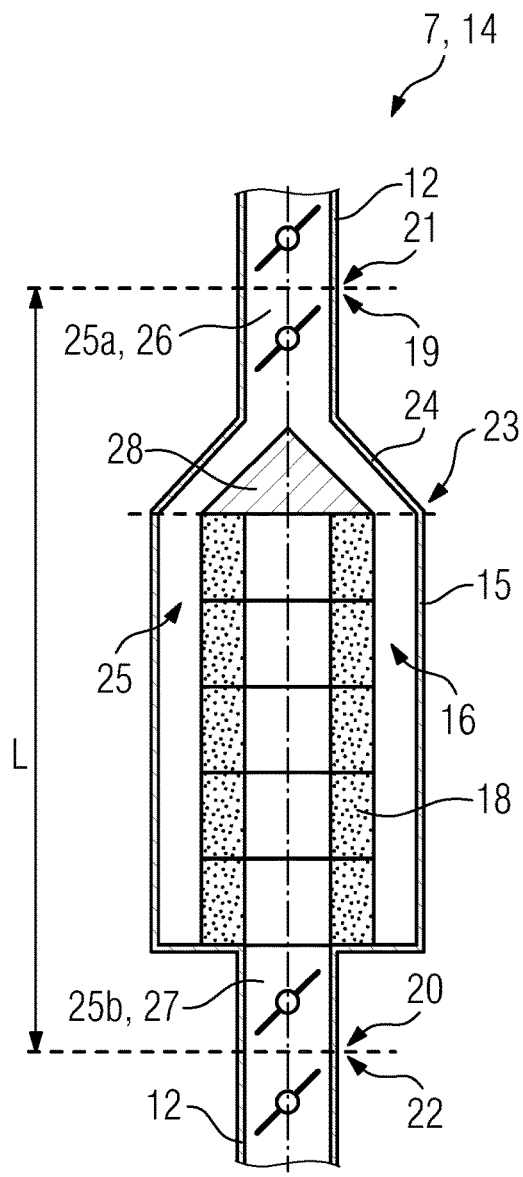
FIGS. 2, 3 each show a schematic diagram of a filter module according to an exemplary embodiment.
Figure 3:
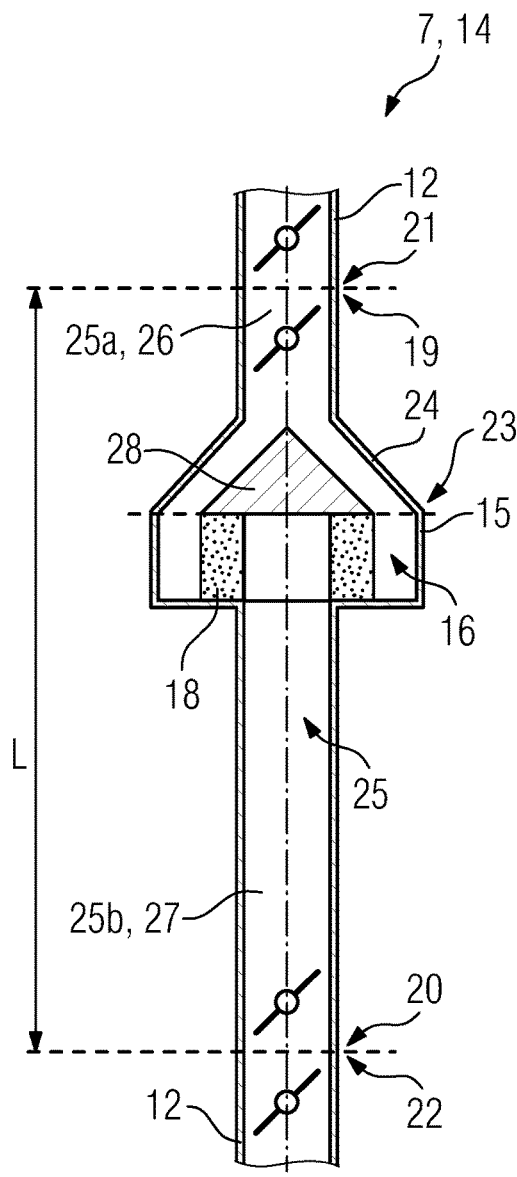

FIGS. 2, 3 each show a schematic diagram of a filter module 14 associated with the filter device 7 in a (longitudinal) sectional view.

The filter modules 14 shown in FIGS. 2, 3 each have a filter module housing 15 or a filter body receiving room 16 with a (hollow) cylindrical base shape with given dimensions, i.e., a given outside and inside radius and a given height. Due to their given dimensions, the respective filter body receiving rooms 16 are configured with a defined geometry. Due to their respective geometrically defined configuration, the filter body receiving rooms 16 can each receive only a defined number of filter bodies 18 configured with a defined geometry, i.e., in the exemplary embodiment filter bodies 18 with a ring-shaped base shape, the outside and inside radius and height or total height of which are adapted to the dimensions of the respective filter body receiving room 16.

In the filter body receiving room 16 of the filter module 14 shown in FIG. 2, five filter bodies 18 can be received, whereas in the filter body receiving room 16 of the filter module 14 shown in FIG. 3, just one (single) filter body 18 can be received.

The respective filter body receiving rooms 16 therefore have a spatially defined filter body receiving room volume ("volume") in which (only) the respective defined number of filter bodies 18 configured with a defined geometry is or can be received. As results from FIG. 3, a defined number of filter bodies configured with a defined geometry is also understood to mean a number of one, i.e., a filter body receiving room 16 can also receive just one (single) filter body 18 configured with a defined geometry. It might also be imaginable to arrange in the exemplary embodiment shown in FIG. 2 one single elongated filter body 18 the height of which corresponds to the total height of the five individual filter bodies 18. Due to its comparably larger height, the elongated filter body 18 has a different geometrically defined configuration than the individual filter bodies 18.

Therefore, the filter module housings 15 of the filter modules 14 differ in the respective defined number of filter bodies 18 configured with a defined geometry that are or can be received in the respective filter body receiving rooms 16 configured with a defined geometry comprised in the filter module housing. Hence, the filter body receiving rooms 16 of the respective filter module housings 15 differ in their respective filter body receiving volumes, wherein, as mentioned, every filter body receiving room 16 can receive only a defined number of filter bodies 18 configured with a defined geometry.

From FIGS. 2, 3 it can be seen that, starting out from filter bodies 18 with a specific geometrically defined configuration, i.e., here ring-shaped filter bodies 18 with a given outside and inside radius and a given height, a first filter module 14 comprises a filter body receiving room 16 in which a first number of such filter bodies 18 is or can be received, and a second (or further) filter module 14 comprises a filter body receiving room 16, in which a second number, which is different from the first number, of such filter bodies 18 is or can be received. As mentioned, in the filter body receiving room 16 of the filter module 14 shown in FIG. 2, five filter bodies 18 can be received and in the filter body receiving room 16 of the filter module 14 shown in FIG. 3, just one (single) filter body 18 can be received.

From FIG. 2 it can furthermore be seen that, if several filter bodies 18 are received in a filter body receiving room 16, these can be arranged stack-type on top of each other. The here ring-shaped filter bodies 18 are arranged aligned with each other; the respective interiors defined by the filter body are aligned with each other. To ensure a (position-) stable arrangement of the filter bodies 18 in respective filter body receiving rooms 16, the filter bodies 18 are received with a force or press fit in the respective filter body receiving rooms 16.

From FIGS. 2, 3 it can furthermore be seen that every filter module 14 comprises two connection interfaces 19, 20 via which it is or can be connected, if required, to a defined connection area 21, 22 of the line or pipe structure 12 of the apparatus that is or can be flown through by the process gas 9 that is or can be filtered. The connection areas 21, 22 of the apparatus comprise connecting pieces (not denoted in more detail) comprising flange areas. The filter modules 14 can therefore be exchanged if required to ensure efficient operation of the filter device 7 for a specific additive construction process. A filter device 7 with a variably adaptable filter size is thus provided. The filter size is conditional upon the use of different filter modules 14 or the different number of filter bodies 18 received in the filter body receiving rooms 16 of the filter module housings 15 of the respective filter modules 14.

Respective connection interfaces 19, 20 on the filter module comprise suitable fastening and sealing elements (not shown). Respective connection interfaces 19, 20 on the filter module can also be formed as connecting pieces comprising flange areas with respective fastening and sealing elements. Respective fastening elements can be provided for fastening a filter module 14 in a firm stabilized position to the connection areas 21, 22 of the apparatus. A fastening element can allow, e.g., form-locked and/or force-locked fastening of the filter module 7 to the connection areas 21, 22 of the apparatus. A fastening element allowing form-locked and/or force-locked fastening of a filter module 7 to a connection area 21, 22 of the apparatus can be, e.g., a fastening or clamping clip. Respective fastening elements can therefore be, e.g., subring-type or full ring-type or -shaped fastening or clamping clips. Respective sealing elements can be, e.g., sealing rings.

The connection interfaces 19, 20 of all filter modules 14 are configured identically; this facilitates any required exchange of respective filter modules 14.

The respective filter modules 14 therefore form preconfigurable or preconfigured assembly groups that can be handled separately. The handling of respective filter modules 14 is hence facilitated; filter modules 14 can be handled or exchanged smoothly, especially also automatably or automatedly.

Evidently, only filter modules 14 or filter module housings 15 with a specific geometrically defined configuration, especially a specific length, are connectible to the connection areas 21, 22 of the apparatus; therefore, only filter modules 14 or filter module housings 15 with a specific geometrically defined configuration, especially a specific length, can be connected to the connection areas 21, 22 of the apparatus. Therefore, the filter modules 14 have a corresponding geometrically defined configuration, especially a corresponding length, which allows precisely fitting connection of the filter modules 14 to the connection areas 21, 22 of the apparatus. The total length L of the filter modules 14 or filter module housings 15 shown in FIGS. 2, 3 is identical.

In every filter module housing 15, a flow channel structure 25 is formed that can be or, during operation of the filter device 7, is flown through by the process gas 9 or the process gas flow. The flow channel structure 25 comprises a first flow channel structure section 25a comprising a tubular inflow section 26 for flowing the process gas 9 to be filtered or a process gas flow to be filtered into the filter module 14 and a second flow channel structure section 25b comprising a tubular outflow section 27 for flowing the filtered process gas 9 or the filtered process gas flow out of the filter module 14. The two flow channel structure sections 25a, 25b communicate with each other. The filter body/bodies 18 received in the respective filter body receiving room 16 are arranged between the first and second flow channel structure section 25a, 25b. In the first flow channel structure section 25a, an exemplarily conical flow guidance element 28 is arranged, which purposefully guides the process gas 9 to be filtered to the filter bodies 18.

Every filter module 14 optionally comprises a closure device 23 arranged or formed on the filter module housing. The respective filter module housings 15 have an access opening (not denoted in more detail) that can be closed with the respective closure device 23 and forms an access option into the respective filter body receiving room 16. The interaction of the closure device 23 and the access opening allows a possibly required, i.e., for example, for service purposes, exchange of a (or several) filter body/bodies 18.

The closure device 23 comprises a cap-like closing element 24, possibly arranged or formed movably on the filter module housing 15. In the exemplary embodiments shown in FIGS. 2, 3, the closing element 24 is formed by a part of the first flow channel structure section 25*a* comprising the tubular inflow section 26.

The closing element 24 is movably (pivotingly) supported between an open position in which the closing element 24 is moved relatively to the access opening such that accessing the filter body receiving room 16 is possible, and a closed position shown in FIGS. 2, 3 in which the closing element 24 is moved relatively to the access opening such that accessing the filter body receiving room 16 is not possible. In the closed position, the closing element 24 is typically moved relatively to the access opening, i.e., especially towards the access opening, such that the filter body receiving room 16 is closed fluid-tightly.

The invention claimed is:

1. An apparatus for additive manufacturing of three-dimensional objects by successive, selective layer-by-layer exposure and thus successive, selective layer-by-layer solidification of construction material layers of construction material with an energy beam, the apparatus comprising:
   a filter device provided for filtering a process gas arising in the course of performing additive construction processes in a process chamber of the apparatus, the process gas containing impurities arising related to the process;
   a first filter module of the filter device, comprising a first filter module housing, the first filter module housing comprising:
      a first filter body receiving room configured with a first receiving room length for receiving a first number of at least one filter body; and
      a first flow channel structure having a first inflow section having a first inflow section length configured for flowing the process gas into the first filter body receiving room and a first outflow section having a first outflow section length configured for flowing the process gas out of the first filter body receiving room; and
   a second filter module of the filter device, comprising a second filter module housing, the second filter module housing comprising:
      a second filter body receiving room configured with a second receiving room length for receiving a second number of the at least one filter body, wherein the second number is greater than the first number; and
      a second flow channel structure having a second inflow section having a second inflow section length configured for flowing the process gas into the second filter body receiving room and a second outflow section having a second outflow section length configured for flowing the process gas out of the second filter body receiving room;
   wherein each of the first and second filter modules has an equal total length defined as a sum of the respective inflow section, outflow section, and receiving room lengths.

2. The apparatus according to claim 1, wherein a respective filter module forms an assembly group that is or can be preconfigured and handled separately.

3. The apparatus according to claim 1, wherein connection interfaces, configured for connecting to connection areas of a pipe structure of the apparatus, of respective ones of the filter modules are configured identically.

4. The apparatus according to claim 3, wherein only filter module housings with a specific geometrically defined configuration comprising said total length, can be connected to the connection areas of the apparatus.

5. The apparatus according to claim 1, wherein the filter body/bodies received in a respective filter body receiving room comprised in the filter module housing is/are received with a press fit in the respective filter body receiving room.

6. The apparatus according to claim 1, wherein respective ones of the filter modules comprise a closure device arranged or formed on the filter module housing, wherein a respective filter module housing has an access opening that can be closed with the respective closure device and forms an access option into the respective filter body receiving room.

7. The apparatus according to claim 6, wherein the closure device comprises a cap-like closing element.

8. The apparatus according to claim 1, wherein each of the first and second flow channel structures comprises a first flow channel structure section comprising the inflow section for flowing the process gas to be filtered into the filter module and a second flow channel structure section comprising the outflow section for flowing a filtered process gas out of the filter module, wherein the filter body/bodies received in the respective filter body receiving room comprised in the filter module housing is/are arranged between the first and second flow channel structure section.

9. A filter device for an apparatus for additive manufacturing of three-dimensional objects by successive, selective layer-by-layer exposure and thus successive, selective layer-by-layer solidification of construction material layers of construction material with an energy beam, wherein the filter device comprises:
   a first filter module, comprising a first filter module housing, the first filter module housing comprising:
      a first filter body receiving room configured with a first receiving room length for receiving a first number of at least one filter body; and
      a first flow channel structure having a first inflow section having a first inflow section length configured for flowing the process gas into the first filter body receiving room and a first outflow section having a first outflow section length configured for flowing the process gas out of the first filter body receiving room; and
   a second filter module, comprising a second filter module housing, the second filter module housing comprising:
      a second filter body receiving room configured with a second receiving room length for receiving a second number of the at least one filter body, wherein the second number is greater than the first number; and
      a second flow channel structure having a second inflow section having a second inflow section length configured for flowing the process gas into the second filter body receiving room and a second outflow section having a second outflow section length configured for flowing the process gas out of the second filter body receiving room;

wherein each of the first and second filter modules has an equal total length defined as a sum of the respective inflow section, outflow section, and receiving room lengths.

10. The apparatus according to claim 1, wherein the respective filter body receiving volumes are determined based at least in part on an amount of impurities expected to be in the process gas when performing a corresponding additive construction process.

11. The apparatus according to claim 1, wherein the filter bodies comprise stack-type filter bodies and/or row-type filter bodies.

12. The filter device according to claim 9, wherein a respective filter module forms an assembly group that is or can be preconfigured and handled separately.

13. The filter device according to claim 9, wherein respective ones of the filter modules comprise a closure device arranged or formed on the filter module housing, wherein a respective filter module housing as an access opening that can be closed with the respective closure device and forms an access option into the respective filter body receiving room.

14. The filter device according to claim 13, wherein the closure device comprises a cap-like closing element.

15. The filter device according to claim 9, wherein each of the first and second flow channel structures comprises a first flow channel structure section comprising the inflow section for flowing the process gas to be filtered into the filter module and a second flow channel structure section comprising the outflow section for flowing a filtered process gas out of the filter module, wherein the filter body/bodies received in the respective filter body receiving room comprised in the filter module housing is/are arranged between the first and second flow channel structure section.

16. The filter device according to claim 9, wherein the respective filter body receiving volumes are determined based at least in part on an amount of impurities expected to be in the process gas when performing a corresponding additive construction process.

17. The filter device according to claim 9, wherein the filter bodies comprise stack-type filter bodies and/or row-type filter bodies.

18. The filter device according to claim 9, wherein respective filter modules comprise two connection interfaces.

19. The apparatus according to claim 1, wherein the first and second inflow and outflow sections are tubular.

20. The filter device according to claim 9, wherein the first and second inflow and outflow sections are tubular.

* * * * *